United States Patent [19]
Fielden et al.

[11] Patent Number: 5,581,390
[45] Date of Patent: Dec. 3, 1996

[54] APPARATUS AND METHOD FOR CONVEYING FRAME TIMING, DATA TIMING, AND DATA

[75] Inventors: John N. Fielden, Tempe; Stuart L. Card, Gilbert; James A. Stephens, Chandler, all of Ariz.

[73] Assignee: Motorola, Inc., Schaumburg, Ill.

[21] Appl. No.: 509,920

[22] Filed: Aug. 1, 1995

[51] Int. Cl.⁶ .................................................. H04J 14/08
[52] U.S. Cl. ........................................... 359/158; 359/140
[58] Field of Search ................................... 359/158, 173, 359/172, 186, 188, 140; 375/106, 113

[56] References Cited

U.S. PATENT DOCUMENTS

| | | | |
|---|---|---|---|
| 4,961,188 | 10/1990 | Lau | 370/94.2 |
| 5,268,935 | 12/1993 | Mediavilla et al. | 375/118 |
| 5,337,334 | 8/1994 | Molloy | 375/118 |

Primary Examiner—Wellington Chin
Assistant Examiner—Rafael Bacares
Attorney, Agent, or Firm—Gregory J. Gorrie

[57] ABSTRACT

A space-based communications network (10) includes satellites (12) placed in low-earth orbits (14). Satellites (12) engage in bulk communications with central switching offices (CSOs 22) and round control stations (GCSs 24). CSOs (22) and GCSs (24) include a network gateway (30) and any number-of remotely located earth terminals (32). Network gateway may provide telemetry, tracking and control functions for the constellation of satellites. Data are conveyed between the gateway (30) and earth terminals (32) over fiber optic cables (42) which convey a variety of different signals. Opposing unidirectional primary and secondary data communication channels each include signal sets having a gapped clock signal (76) and a data signal (86). The gapped clock signal (76) oscillates in synchronism with the data signal (86) and conveys both data timing and frame timing cable bundles (42) additionally convey LAN signals.

20 Claims, 5 Drawing Sheets

APPARATUS AND METHOD FOR CONVEYING FRAME TIMING, DATA TIMING, AND DATA

FIELD OF THE INVENTION

The present invention relates generally to the transmission of digital data between remotely located positions.

BACKGROUND OF THE INVENTION

Communications and computer equipment often need to convey digital data between two remotely located positions. As a general rule, digital data are more easily conveyed over shorter distances and/or at slower data transfer rates. However, many techniques are known for transferring digital data over very long distances and at high data transfer rates. These techniques for transferring data over long distances and/or at high transfer rates all suffer a penalty in the form of complicated circuitry and/or complicated data processing. Complications are highly undesirable because they lead to excessive engineering design efforts, reduced reliability, increased installation efforts, increased maintenance efforts, and overall higher costs.

One technique which yields simple and desirable data conveyance implementations involves the use of a gapped clock signal which conveys both frame timing and data or bit timing. The gapped clock signal is transmitted through one communication channel in parallel with another channel which transmits a data signal. The gapped clock indicates when to sample the data signal on the receiving end of the channel so that the data may be successfully recovered. In addition, the gapped clock indicates which data occur at the start of a frame. Consequently, extremely simple transmitter and receiver designs successfully transmit and recover data and partition the recovered data into frames. Unfortunately, conventional gapped clock data transmission schemes are limited to short distances.

Conventional techniques for communicating data at higher data rates and for longer distances are concerned primarily with maximizing the amount of data that can be communicated over a communication medium, such as a fiber optic cable, a coaxial cable, twisted pair cable, RF channel, or the like. Such techniques typically require the multiplexing or mixing of a clock with data. This multiplexing or mixing of clock and data has the desirable attributes of efficiently utilizing the communication media and of preventing clock and data from skewing in time relative to each other at the receiving end.

Unfortunately, the multiplexing or mixing of clock and data has the undesirable attribute of excessively complicated circuitry and/or data processing. At the transmitting end of a communication channel, the clock and data must be mixed together. At the receiving end, the clock must be recovered from the received signal. If a provided clock is not a free-running clock but a gapped clock, then a clock must be regenerated during gap periods. The regeneration of clock signals is well known in the art, and typically uses phase locked loop circuits. However, typical gapped clock signals include gaps of sufficient duration to cause phase locked loop circuits to lose lock or significantly drift. Thus, regenerated clock signals become inaccurate immediately following the gap periods when accuracy is important for conveying frame timing. While other techniques are known and can be devised to interface such signals to conventional high speed and long distance data communication channels, the other techniques tend to become more and more complicated. For example, a simple gapped clock transmission scheme may be converted for transmission over a complicated E1 link through the use of individually configured VME cards for each channel.

In some situations, transmission over long distances requires the use of repeater stations. The use of a single repeater station is an undesirable consequence, and this undesirable consequence is made worse when many repeater stations are needed and when the transmission distance varies from situation to situation. Each transmission situation may require a separate design, and the use of different designs for different situations further complicates the data transmission problem.

Accordingly, a need exists for a simple apparatus and method for conveying a gapped clock signal and associated data over relatively long distances at relatively high speeds.

BRIEF DESCRIPTION OF THE DRAWINGS

A more complete understanding of the present invention may be derived by referring to the detailed description and claims when considered in connection with the figures wherein like reference numbers refer to similar items throughout the figures, and:

DETAILED DESCRIPTION OF THE DRAWINGS

Figure 1:
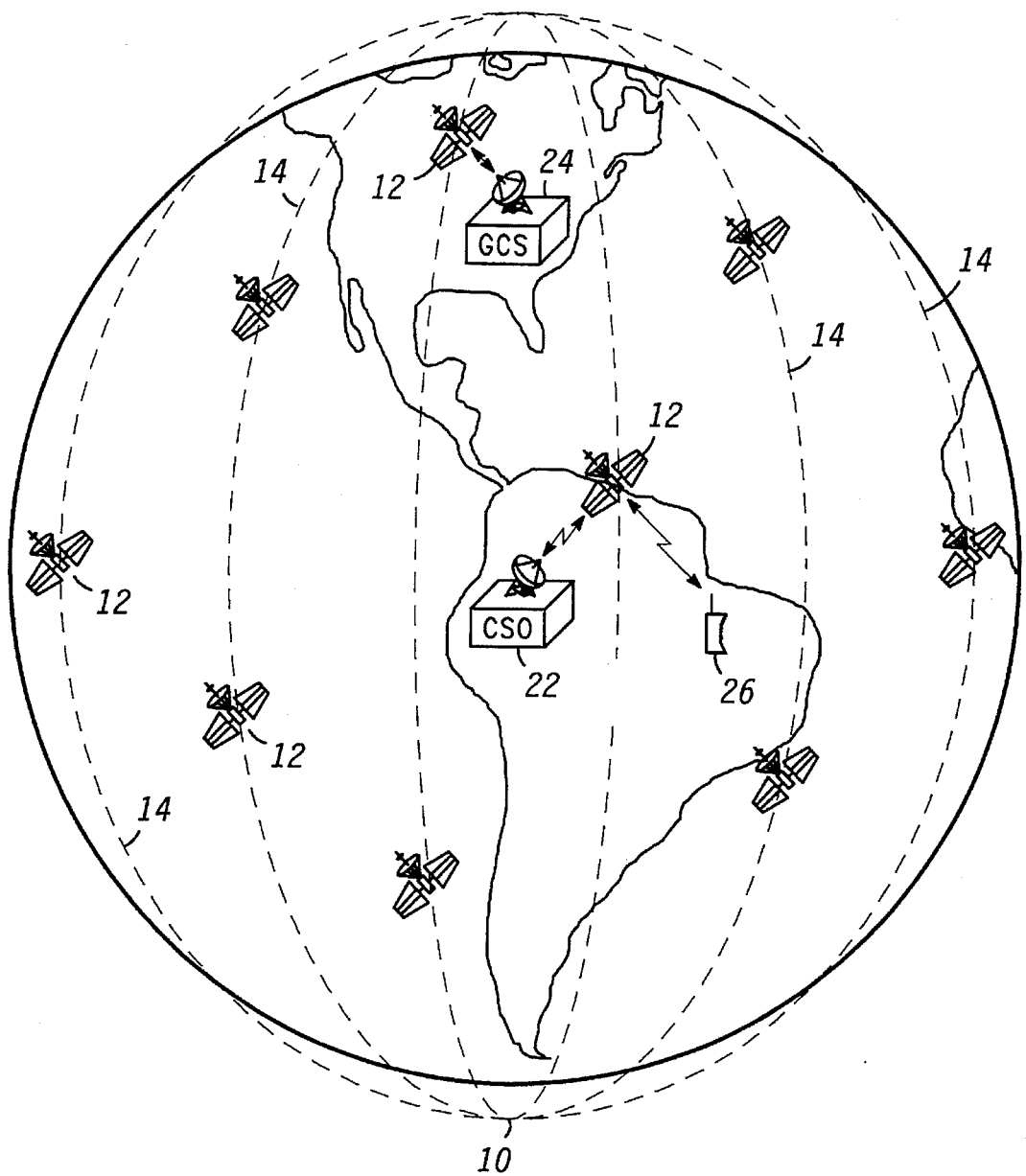
FIG. 1 shows a diagram of an environment in which the present invention may be practiced.

FIG. 1 illustrates a satellite-based communication network 10. Network 10 is dispersed over the earth through the use of a constellation of orbiting satellites 12. In the currently preferred embodiment, satellites 12 occupy polar, low-earth orbits 14. In particular, the preferred embodiment of network 10 uses six polar orbits 14 with each orbit holding eleven satellites 12 for a total of sixty-six satellites 12. For clarity, FIG. 1 illustrates only a few of these satellites 12.

Orbits 14 and satellites 12 are distributed around the earth. In the example depicted for the currently preferred embodiment, each orbit 14 encircles the earth at an altitude of around 765 km. Due to the relatively low orbits of satellites 12, substantially line-of-sight electromagnetic transmissions from any one satellite cover a relatively small area of the earth at any point in time. For example, when satellites 12 occupy orbits at around 765 km above the earth, such transmissions may cover "footprint" areas around 5000 km in diameter. Moreover, due to the low-earth character of orbits 14, satellites 12 travel with respect to the earth at around 25,000 km/hr so that a satellite 12 remains within view of a point on the surface of the earth for a maximum period of around nine to ten minutes. Within orbits 14, satellites 12 maintain relatively constant distances between one another. However, orbits 14 cause satellites 12 to converge toward one another while approaching the polar regions and diverge away from one another while approaching the equator.

Satellites 12 communicate with devices on the ground through many central switching offices (CSOs) 22, of which FIG. 1 shows only one, a few ground control stations (GCSs) 24, of which FIG. 1 shows only one, and any number of subscriber units 26, of which one is shown in FIG. 1. CSOs 22, GCSs 24, and subscriber units 26 may be located anywhere on the surface of the earth or in the atmosphere above the earth.

GCSs 24 preferably perform telemetry, tracking, and control (TT&C) functions for the constellation of satellites 12. While not a requirement of the present invention, network 10 desirably locates GCSs 24 in extreme northern or extreme southern latitudes, near the polar regions of the earth. At these extreme latitudes the above-discussed convergence of orbits 14 causes many satellites 12 to come within view or radio range of the GCS 24 within a short period of time. Thus, within this short period of time, direct communications may take place between GCS 24 and any satellite 12. However, a consequence of location at extreme latitudes is that installation, operation, and maintenance all take place in remote areas where these activities are more expensive than they may be elsewhere. In addition, any equipment exposed to the elements needs to withstand extremely cold temperatures.

CSOs 22 are configured similarly to GCSs 24. However, CSOs 22 operate as communication nodes in network 10. Diverse terrestrial-based communications systems, such as the worldwide public switched telecommunications network (not shown), may access network 10 through CSOs 22. Conventional land-line and radio telecommunication calls are routed into and out from network 10 at CSOs 22. These calls are up-linked to the overhead satellites 12 which may be within view of the CSO 22 at any given instant. Desirably, CSOs 22 are distributed around the earth in accordance with geopolitical boundaries.

Due to the configuration of the constellation of satellites 12, at least one of satellites 12 is within view of each point on the surface of the earth at all times. Accordingly, network 10 may establish a communication circuit through the constellation of satellites 12 between any two subscriber units 26, between any subscriber unit 26 and a CSO 22, or between any two CSOs 22.

Figure 2:
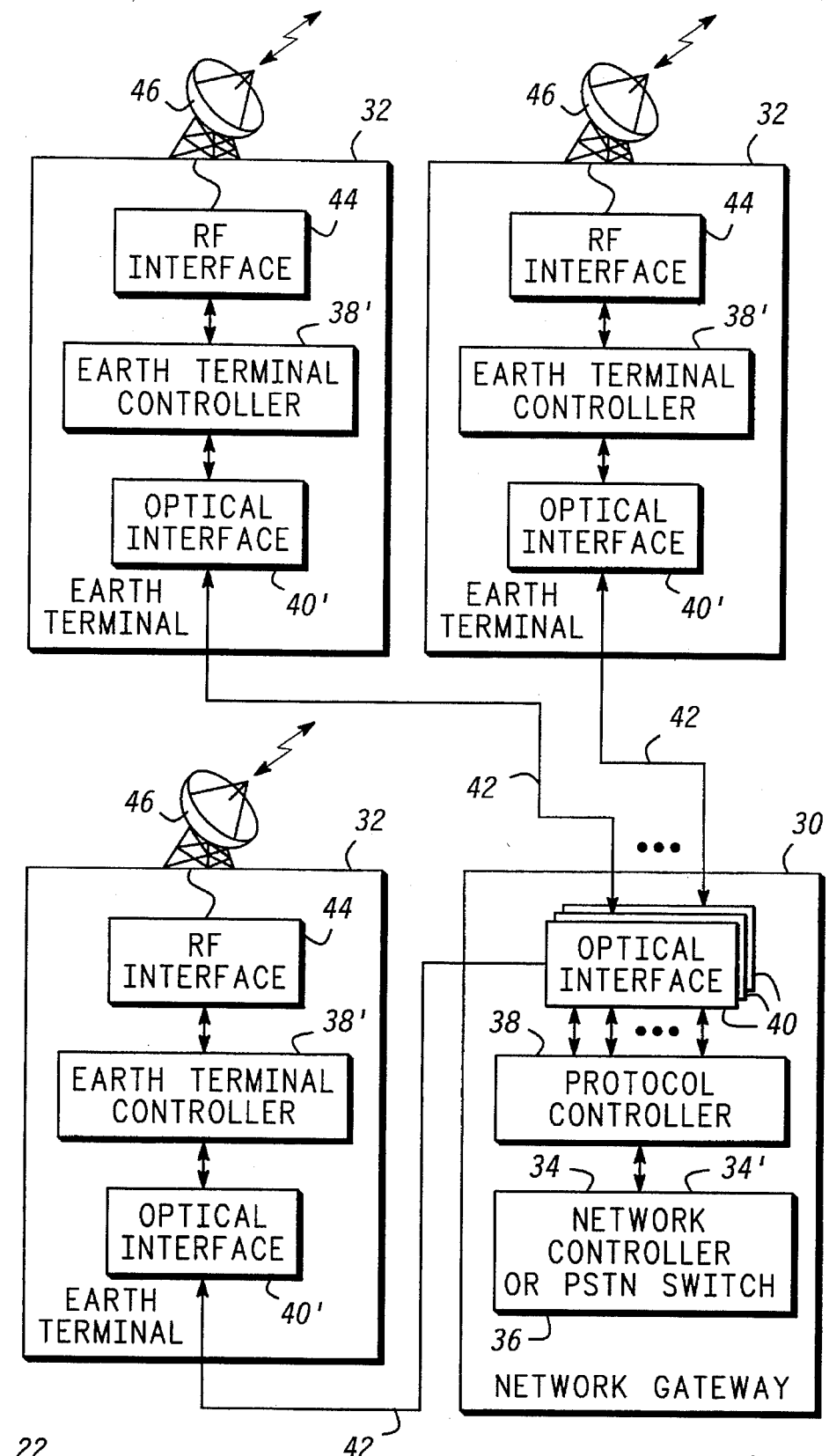
FIG. 2 shows a block diagram of a network gateway and associated earth terminals.

FIG. 2 shows a block diagram of an earth node 28 of network 10. Earth node 28 may be either a CSO 22 or a GCS 24. Earth node 28 includes a network gateway 30 and any number of earth terminals 32, three of which are shown in FIG. 2. Network gateway 30 interfaces network 10 to suppliers and users of data conveyed by network 10. Earth terminals 32 support communication links with satellites 12 (see FIG. 1). Multiple earth terminals 32 are included at earth node 28 so that multiple communication links may be formed with multiple satellites 12 simultaneously, so that communication links with some satellites 12 may continue while directional antennas are moving to initiate new links with other satellites 12, and so that back-up is provided.

Earth terminals 32 are physically located remotely from one another and from network gateway 30. The separation distance will vary from installation to installation. Typical distances are greater than 100 meters and less than three kilometers. Positions for earth terminals 32 are remotely located from one another to lessen electrical interference problems, to provide sufficient physical space to conveniently construct, operate, and maintain earth terminals 32, and to provide an improved level of reliability. Desirably, each earth terminal 32 is configured like the other earth terminals 32.

Network gateway 30 includes a network controller 34 when earth node 28 is configured as a GCS 24 or includes a PSTN switch 34' when earth node 28 is configured as a CSO 22. Network controller 34 and PSTN switch 34' supply data which are then transmitted to the constellation of satellites 12 where the data are then conveyed to appropriate destinations for the data. Network controller 34 and network switch 34' also accept data which have been received from the constellation of satellites 12. At a CSO 22, received data are then delivered through PSTN switch 34' to their destination. At a GCS 24, received data are then processed at network controller 34 in accordance with telemetry, tracking and control functions for the constellation of satellites 12. Either network controller 34 or PSTN switch 34' serves the role of a terminus 36 for data flowing through earth node 28.

Network controller 34 or PSTN switch 34' couples to a protocol controller 38 of network gateway 30. Protocol controller 38 terminates applications level protocols for data flowing through gateway 30. When protocol controller 38 couples to network controller 34 in GCS 24, protocol controller 38 may terminate a TCP/IP protocol, terminate a network-specific protocol which is efficient for use in network 10, and form a connection between the two protocols. At a hardware level, the network specific protocol conveys data using a gapped clock to indicate data or bit timing and to indicate frame timing. The specific nature of this protocol above the hardware level is unimportant to the present invention. When protocol controller 38 couples to PSTN switch 34', protocol controller 38 terminates a data transmission protocol utilized by PSTN switch 34' and connects this protocol to the network specific protocol.

Protocol controller 38 couples to optical interfaces 40. Desirably, one optical interface 40 is used in network gateway 30 for each earth terminal 32 included at earth node 28. Each optical interface 40 of network gateway 30 couples to a first end of a fiber optic bundle 42. A second end of each fiber optic bundle 42 couples to an optical interface 40' located in a corresponding earth terminal 32.

With reference to a single earth terminal 32, optical interface 40' couples to an earth terminal controller 38', and controller 38' couples to an RF interface 44. RF interface 44 couples to a primary, directional antenna 46. Controller 38' provides higher level protocol translations and timing adjustments to data flowing through earth terminal 32. RF interface 44 includes the modems, transmitters, and receivers (not shown) needed to engage in RF communications with satellites 12. Primary antenna 46 serves the role of a terminus 36 for data flowing through earth node 28.

Earth node 28 supports both primary and secondary communications with satellites 12. Primary communications take place at a high data rate, desirably above 1 Mbps and preferably above 3 Mbps, while secondary communications take place at a low data rate, preferably around 1 Kbps. Desirably, secondary communications are configured to occur over a very robust communication link. Due to the low data rate, transmissions occur at a high energy per bit ratio. Secondary communications may serve to convey basic control data. Such basic control data may instruct satellites to adjust their attitudes so that primary communications may then commence. Primary communications are intended to convey call data traffic over a much more efficient but delicate communication link. Directional antenna 46 must successfully track satellites 12, and a similar directional antenna (not shown) on board satellites 12 must track antenna 46 as satellite 12 moves overhead for primary communications to be successful. Accordingly, data flowing between network gateway 30 and earth terminal 32 conforms to both primary and secondary communication requirements.

Figure 3:
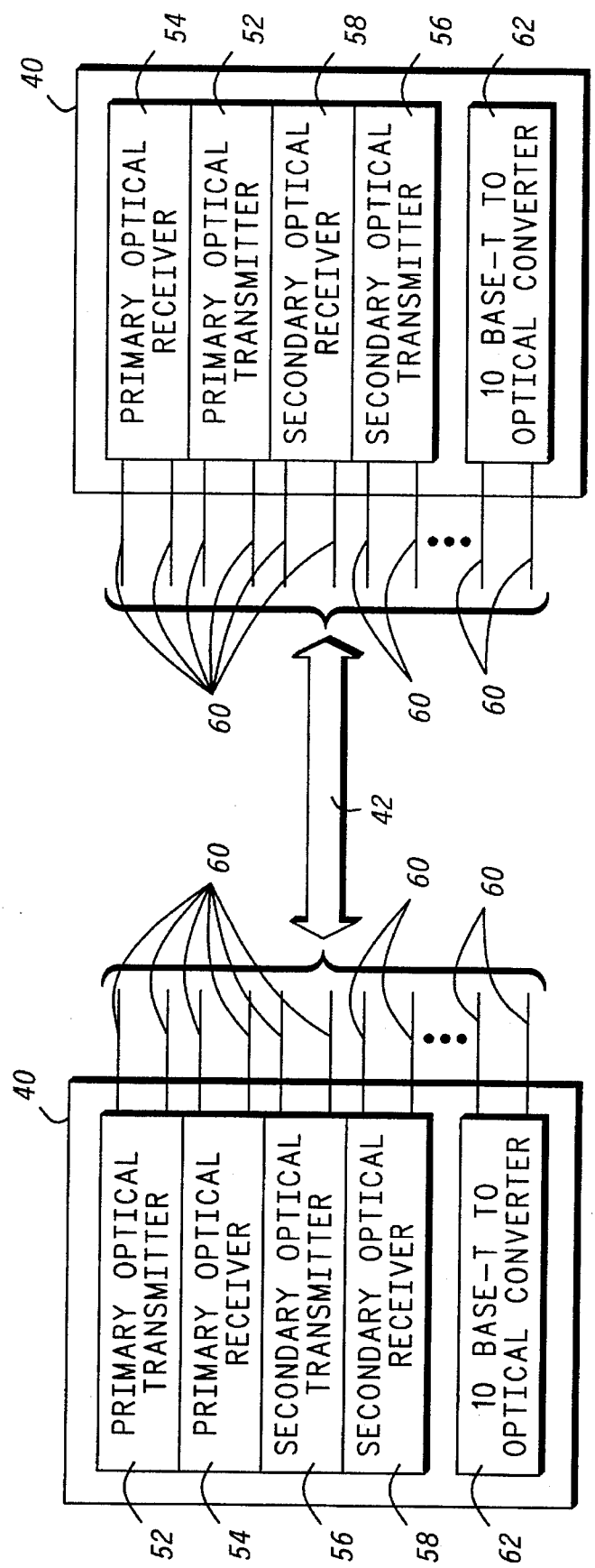
FIG. 3 shows a block diagram of a fiber optic transmission subsystem which couples the network gateway to an earth terminal.

FIG. 3 shows a block diagram of a fiber optic transmission subsystem 50 which couples network gateway 30 to any one of earth terminals 32 (see FIG. 1). Optical interfaces 40 or 40', hereinafter referred to singularly or collectively as optical interfaces 40, couple to fiber optic cable bundle 42. Fiber optic cable 42 is routed between the positions for gateway 30 and earth terminal 32. Optical fibers are desirable data transmission media for conveying signals between gateway 30 and earth terminals 32 because they support a varying distances without the use of repeaters. In other words, they can convey signals for a wide range of distances simply by using cables 42 of different lengths. Thus, different transmission subsystem designs need not be derived for each installation when each installation can convey signals over different distances. Cables 42 may be jacketed to withstand harsh environmental conditions, such as extremely low temperatures. In addition, cables 42 provide security and exhibit immunity from lightning and other electromagnetic interference. Moreover, a single cable 42 can convey a wide diversity of signal types, such as primary and secondary communications and LAN signals.

Each optical interface 40 includes a primary optical transmitter channel 52, a primary optical receiver channel 54, a secondary optical transmitter channel 56, and a secondary optical receiver channel 58. Each of channels 52, 54, 56, and 58 operates independently of the others. Each of channels 52, 54, 56, and 58 conveys a signal set having two signals. The two signals include a gapped clock signal and a data signal. The two signals from each signal set are conveyed over two independent optical fibers 60 through a common fiber optic bundle 42. Optical fibers 60 conveying signal sets propagating in an outgoing direction, from gateway 30 to earth terminal 32 (see FIG. 2), couple to transmitter channels 52 and 56 at gateway 30 and to receiver channels 54 and 58, respectively, at earth terminal 32. Optical fibers 60 conveying signal sets propagating in an incoming direction, from earth terminal 32 to gateway 30, couple to receiver channels 54 and 58 at gateway 30 and to transmitter channels 52 and 56, respectively, at earth terminal 32.

In addition, optical interface 40 includes a LAN-to-optical converter 62, which in the preferred embodiment converts conventional 10Base-T Ethernet LAN signals into a pair of optical signals. This pair of optical signals is conveyed through a pair of optic fibers included in common fiber optic cable 42. Accordingly, common fiber optic cable 42 conveys a variety of different signals, including primary communications, secondary communications, and LAN communications.

Figure 4:
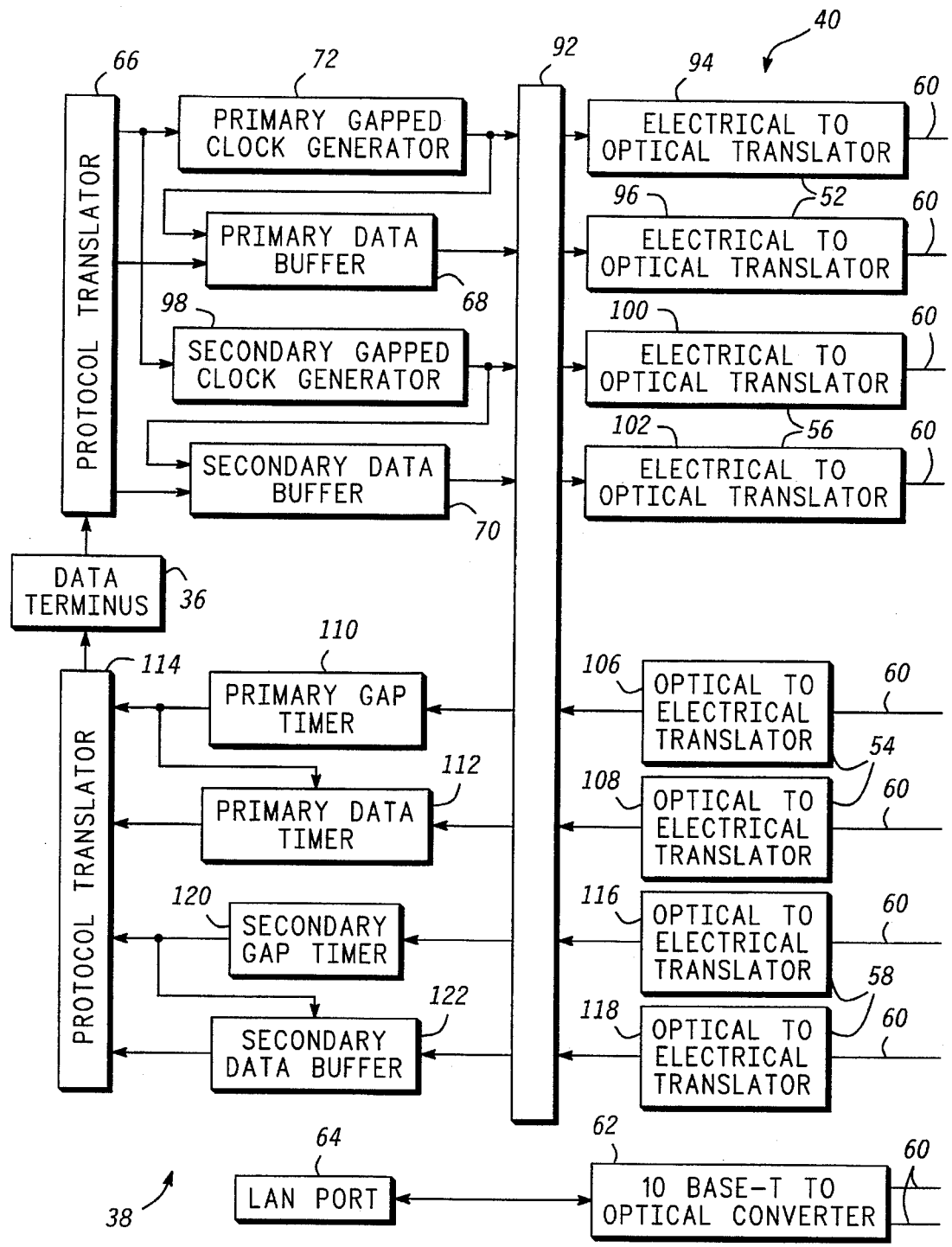
FIG. 4 shows a block diagram of various signals and channels coupling either an earth terminal controller to an optical interface or a protocol controller to an optical interface.

FIG. 4 shows a block diagram of various signals and channels coupling either an earth terminal controller 38' to an optical interface 40 or a protocol controller 38 to an optical interface 40. Controllers 38 and 38' perform similar tasks for the purpose of operating optical interfaces 40 and are referred to singularly and collectively as controller or controllers 38 below. Generally, controller 38' includes a LAN port 64 which uses conventional 10Base-T electrical signals and which couples to optical converter 62 through conventional twisted pair wires.

A data terminus 36 provides data to a protocol translator 66. Protocol translator 66 strips payload data from overhead data and repackages the payload data into frames. These payload data frames may be provided to a primary data buffer 68 if they will be conveyed by primary communications or to a secondary data buffer 70 if they will be conveyed by secondary communications. Protocol translator 66 provides a control signal and/or a free running clock signal to a primary gapped clock generator 72.

Figure 5:
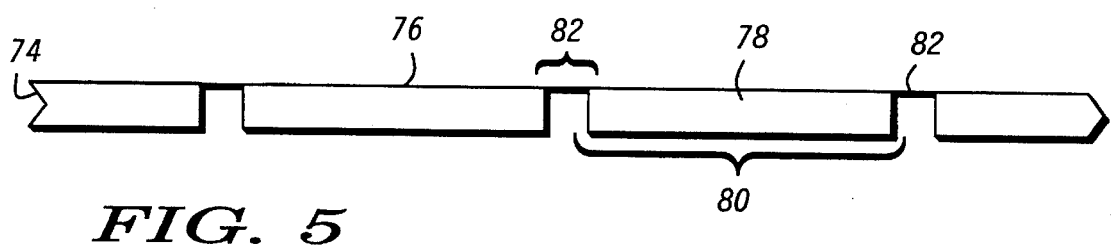
FIGS. 5 and 6 show a timing diagram depicting a gapped clock and related data signals.
Figure 6:
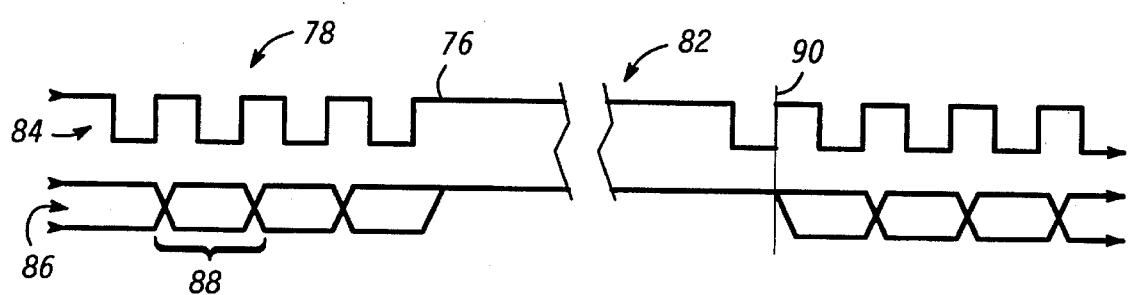

FIG. 5 and 6 show a timing diagram depicting the gapped clock and related data signals. As illustrated in a trace 74, a gapped clock signal 76 oscillates for an active portion 78 of a frame 80 and refrains from oscillating for a gap portion or gap 82 of frame 80. Frames 80 repeat continuously. Data are conveyed during active portion 78, and not during gap 82. In the preferred embodiment, frame 80 has a duration of around 9 ms, gap 82 has a duration of around 90 microseconds, and gapped clock signal 76 oscillates at around 3.125 MHz during active portion 78. Accordingly, gap 82 is sufficiently long to cause a phase locked loop, if used, to drift significantly from a locked state established during active portion 78. Accordingly, gapped clock signal 76 does not lend itself to conventional clock regeneration techniques.

Second and third traces 84 and 86 of FIG. 6 illustrate a portion of a frame 80 at around the end of one frame 80 and the beginning of a next frame 80. A unit of data is conveyed during each baud period 88. The unit of data is the smallest number of bits independently conveyed and may include one or more bits. A baud represents the period over which the single unit of data is conveyed. Gapped clock signal 76 oscillates at one cycle per baud during active portion 78, and data changes in synchronism with gapped clock signal 76. Thus, buffers on a receiving end of a transmission channel directly clock data into input latches using gapped clock signal 76.

During gap 82, gapped clock signal 76 refrains from oscillation, and data represent a "don't care" situation. No data are extracted at the receiving end during gap 82. However, the first clock transition following gap 82 is interpreted at the receiving end as a start 90 of frame 80. Accordingly, gapped clock signal 76 additionally conveys frame timing. Circuits on the receiving end need not interpret data to find start 90 of frame 80, and circuits on the receiving end need not impose delays in order to acquire data signals.

Referring to FIGS. 4, 5 and 6, primary gapped clock generator 72 and primary data buffer 68 generate an electrical gapped clock signal 76 and an electrical data signal 86. Electrical data signal 86 is generated in synchronism with gapped clock signal 76. In the preferred embodiment, signals 76 and 86 are conveyed over balanced lines 92 in accordance with EIA-530 standards. Balanced lines 92 convey the electrical signals 76 and 86 to electrical to optical translators 94 and 96, respectively. Translators 94 and 96 convert electrical signals to optical signals in accordance with well-known techniques and couple to optic fibers 60. Translators 94 and 96 together form channel 52 (see FIG. 3).

A secondary gapped clock generator 98 and secondary data buffer 70 couple through balanced lines to electrical to optical translators 100 and 102, respectively. Translators 100 and 102 couple to optic fibers 60 and together form channel 56 (see FIG. 3). Secondary channel 56 operates similarly to primary channel 52, with one exception. Secondary channel 56 operates at a lower data rate than primary channel 52. For example, secondary gapped clock generator 98 may receive a slower free running clock from which to generate gapped clock signal 76. Other than speed of operation, the gapped clock signal and data signal conveyed for secondary communications are substantially the same as for primary communications.

Although not shown, adjustments may be provided to control the intensity at which optical signals are transmitted over optic fibers 60 by translators 94, 96, 100, and 102. Such adjustments may match optical intensity to optical receiver parameters to prevent saturation.

With respect to receiving optical signals, optical to electrical. translators 106 and 108 together form primary optical receiver channel 54 (see FIG. 3). Translators 106 and 108 couple to optic fibers 60 and use well-known techniques to translate an optical gapped clock signal and an optical data signal, respectively, into electrical signals. The electrical gapped clock and data signals pass through balanced lines to a primary gap timer 110 and a primary data buffer 112. Primary gap timer 110 monitors the gapped clock signal to detect the absence of oscillation during gap 82 and to detect initiation of oscillation which follows gap 82 and which denotes start 90 of frame 80. Primary gap timer 110 provides frame synchronization signals to primary data buffer 112 and to a protocol translator 114. The gapped clock signal directly clocks data into data buffer 112, and data from data buffer 112 is provided to protocol translator 114.

Optical to electrical translators 116 and 118 cooperate with a secondary gap timer 120 and a secondary data buffer 122 to receive a gapped clock signal and a data signal, respectively, for secondary communications. Secondary communication signals operate like the above-discussed primary communication signals, except at a slower data rate.

Protocol translator 114 adds overhead data, such as preambles and the like, as necessary to fully comply with protocol requirements beyond terminus 36 and passes the re-packaged payload data on to terminus 36. In an earth terminal, controller 38 may additionally delay data so that data packets arrive at satellites 12 (see FIG. 1) at precise instants in time in spite of varying propagation delays caused by varying distances between satellites 12 and antenna 46.

In summary, the present invention provides a simple apparatus and method for conveying gapped clock and associated data signals over relatively long distances at relatively high speed. Separate optical transmission media are provided for gapped clock and data signals for each of incoming and outgoing directions of propagation and for each of primary and secondary communications. Moreover, the distances may vary within a wide range without requiring different design efforts to accommodate different ranges. A single cable run accommodates a wide variety of signals from LAN communications, to primary communications, to secondary communications.

The present invention has been described above with reference to preferred embodiments. However, those skilled in the art will recognize that changes and modifications may be made in these preferred embodiments without departing from the scope of the present invention. For example, those skilled in the art will appreciate that the present invention is not limited to conveying separate gapped clock and data signals and that clock and data signals may be multiplexed together, and the specific partitioning and organization Of blocks shown in the figures may change from application to application. These and other changes and modifications which are obvious to those skilled in the art are intended to be included within the scope of the present invention.

What is claimed is:

1. A method for conveying frame timing and data between remotely located first and second positions, said method comprising the steps of:

a) receiving, at said first position, a gapped clock signal which conveys frame timing and data timing;

b) receiving, at said first position, a data signal synchronized to said gapped clock signal;

c) transmitting said gapped clock signal from said first position to said second position over a first optic fiber; and d) transmitting said data signal from said first position to said second position over a second optic fiber.

2. A method as claimed in claim 1 additionally comprising the steps of:

combining said first and second optic fibers in a common fiber optic bundle; and routing said bundle between said first and second positions.

3. A method as claimed in claim 2 additionally comprising the step of configuring said common fiber optic bundle to convey a local area network data transmission medium between said first and second positions in addition to said first and second optic fibers.

4. A method as claimed in claim 2 additionally comprising the steps of:

receiving, at said second position, a second gapped clock signal which conveys frame timing and data timing;

receiving, at said second position, a second data signal synchronized to said second gapped clock signal;

transmitting said second gapped clock signal from said second position to said first position over a third optic fiber; and transmitting said second data signal from said second position to said first position over a fourth optic fiber.

5. A method as claimed in claim 4 wherein:

said first and second optic fibers convey said gapped clock and data signals in a first direction to participate in primary communications;

said third and fourth optic fibers convey said second gapped clock and second data signals in a second direction to participate in said primary communications;

said method additionally comprises the step of configuring fifth and sixth optic fibers to convey a third gapped clock signal and third data signal, respectively, in said first direction to participate in secondary communications; and said method additionally comprises the step of configuring seventh and eighth optic fibers to convey a fourth gapped clock signal and fourth data signal, respectively, in said second direction to participate in said secondary communications.

6. A method as claimed in claim 5 additionally comprising the step of transmitting said primary communications at a faster data rate than said secondary communications.

7. A method as claimed in claim 6 wherein:

said first position is occupied by a communication network gateway; and said second position is occupied by an earth terminal having a relatively directional primary communications antenna and a relatively non-directional secondary communications antenna; and said method additionally comprises the step of conducting said primary communications between said gateway and a satellite through said primary communications antenna; and said method additionally comprises the step of conducting said secondary communications between said gateway and said satellite through said secondary communications antenna.

8. A method as claimed in claim 1 wherein:

said first position is occupied by a communication network gateway;

said second position is occupied by an earth terminal having an antenna; and said method additionally comprises the step of transmitting said data signal from said earth terminal to an orbiting satellite.

9. A method as claimed in claim 8 wherein said steps a), b), c), and d), convey said data to said earth terminal through a first fiber optic bundle, and said method additionally comprises the steps of:

conveying second data to a second earth terminal through a second fiber optic bundle; and remotely locating said earth terminal and said second earth terminal from each other and from said gateway.

10. A method as claimed in claim 1 wherein:

said data signal conveys one or more bits of data during a baud period;

for a first period within a frame, said gapped clock signal received in said step a) and transmitted in said step c) oscillates at substantially one cycle per baud;

for a second period within said frame, said gapped clock signal refrains from oscillating;

said second period has a duration equivalent to a multiplicity of baud; and the sum of said first and second periods substantially equals a frame.

11. A method as claimed in claim 1 wherein said gapped clock signal oscillates for a first portion of each frame and refrains from oscillating for a second portion of each frame, and said method additionally comprises the steps of:

receiving said gapped clock and data signals at said second position;

monitoring said gapped clock signal at said second position to detect an absence of oscillation;

determining whether said absence of oscillation exceeds a predetermined duration; and declaring data invalid when said determining step determines said absence of oscillation does not exceed said predetermined duration.

12. A method as claimed in claim 1 wherein said gapped clock signal oscillates for a first portion of each frame and refrains from oscillating for a second portion of each frame, and said method additionally comprises the steps of:

receiving said gapped clock and data signals at said second position;

monitoring said gapped clock signal at said second position to detect an absence of oscillation;

monitoring said gapped clock signal at said second position to detect initiation of oscillation following said absence of oscillation; and synchronizing data framing at said second position to said initiation of oscillation following said absence of oscillation.

13. A signal interfacing apparatus for conveying frame timing and data between remotely located first and second positions, said apparatus comprising:

a first converter, at said first position, for translating an electrical gapped clock signal which conveys frame timing and data timing into an optical gapped clock signal;

a second converter, at said first position, for translating an electrical data signal synchronized to said electrical gapped clock signal into an optical data signal;

a first optic fiber-coupled to said first converter for transmitting said optical gapped clock signal from said first position to said second position; and a second optic fiber coupled to said second converter for transmitting said optical data signal from said first position to said second position.

14. An apparatus as claimed in claim 13 wherein said first and second optic fibers are substantially contained within a common fiber optic bundle which extends between said first and second positions.

15. An apparatus as claimed in claim 13 wherein:

a network gateway occupies said first position;

an earth terminal having an antenna occupies said second position; and said apparatus additionally comprises an orbiting satellite in communication with said earth terminal so that said satellite receives said data from said earth terminal.

16. An apparatus as claimed in claim 15 wherein:

said first and second optic fibers are substantially contained within a first fiber optic bundle which extends between said first and second positions; and said apparatus additionally comprises a second fiber optic bundle configured to convey a second gapped clock signal and a second data signal between said gateway and a second earth terminal, said earth terminal and said second earth terminal being remotely located from each other.

17. An apparatus as claimed in claim 13 wherein:

said data signal conveys one or more bits of data during a baud period; and said electrical gapped clock signal is configured so that, for a first period within a frame, said electrical gapped clock signal oscillates at substantially one cycle per baud, for a second period within said frame said electrical gapped clock signal refrains from oscillating, said second period has a duration equivalent to a multiplicity of baud, and the sum of said first and second periods substantially equals a frame.

18. An apparatus as claimed in claim 13 wherein:

said first and second optic fibers are substantially contained within a common fiber optic bundle which extends between said first and second positions, and said first and second optic fibers convey primary communications in a first direction;

said fiber optic bundle additionally includes third and fourth optic fibers configured to convey said primary communications in a second direction;

said fiber optic bundle additionally includes fifth and sixth optic fibers configured to convey secondary communications in said first direction; and said fiber optic bundle additionally includes seventh and eighth optic fibers configured to convey said secondary communications in said second direction.

19. An apparatus as claimed in claim 18 additionally comprising a third converter, at said first position, for translating a second electrical data signal into an a second optical data signal, said third converter being coupled to said sixth optic fiber, and said second and third converters being configured so that said primary communications occur at a faster data rate than said secondary communications.

20. An apparatus for conveying frame timing and data between remotely located positions, said apparatus comprising:

a gateway configured to generate first and second signal sets, wherein each signal set includes a signal set gapped clock signal which conveys frame timing and data timing and a signal set data signal synchronized to said signal set gapped clock signal;

a first earth terminal remotely located from said gateway;

a second earth terminal remotely located from said first earth terminal;

a first fiber optic cable bundle extending between said gateway and said first earth terminal and having first and second fibers configured to convey said first signal set gapped clock signal and said first signal set data signal; and a second fiber optic cable bundle extending between said gateway and said second earth terminal and having first and second fibers configured to convey said second signal set gapped clock signal and said second signal set data signal.

* * * * *

UNITED STATES PATENT AND TRADEMARK OFFICE
CERTIFICATE OF CORRECTION

PATENT NO. : 5,581,390
DATED : December 3, 1996
INVENTOR(S) : John N. Fielden et al.

It is certified that error appears in the above-identified patent and that said Letters Patent is hereby corrected as shown below:

In column 10, claim 13, line 4, delete "fiber-coupled" and insert --fiber coupled--.

Signed and Sealed this

Ninth Day of September, 1997

Attest:

BRUCE LEHMAN

*Attesting Officer*      *Commissioner of Patents and Trademarks*